(12) United States Patent
Hoerning et al.

(10) Patent No.: US 11,852,121 B2
(45) Date of Patent: Dec. 26, 2023

(54) LIGHTNING PROTECTION FOR A DIRECT DRIVE WIND TURBINE

(71) Applicant: Siemens Gamesa Renewable Energy A/S, Brande (DK)

(72) Inventors: Kenneth Traelle Hoerning, Herning (DK); Anders Erbo R. Jensen, Vejle (DK); Henrik Abild Jensen, Viborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 113 days.

(21) Appl. No.: 16/819,692

(22) Filed: Mar. 16, 2020

(65) Prior Publication Data
US 2020/0300228 A1 Sep. 24, 2020

(30) Foreign Application Priority Data
Mar. 22, 2019 (EP) .................... 19164682

(51) Int. Cl.
 *F03D 80/30* (2016.01)
 *H02G 13/00* (2006.01)
 (Continued)

(52) U.S. Cl.
 CPC ............. *F03D 80/30* (2016.05); *F03D 15/20* (2016.05); *H02G 13/00* (2013.01); *F03D 1/0675* (2013.01);
 (Continued)

(58) Field of Classification Search
 CPC ................................ F03D 80/30; F03D 15/20
 See application file for complete search history.

(56) References Cited

U.S. PATENT DOCUMENTS

| 7,377,750 B1* | 5/2008 | Costin | F03D 80/30 |
| | | | 416/146 R |
| 9,157,419 B2* | 10/2015 | Lewke | F03D 80/30 |

(Continued)

FOREIGN PATENT DOCUMENTS

| CN | 201125843 Y | 10/2008 |
| CN | 104405594 A | 3/2015 |

(Continued)

OTHER PUBLICATIONS

European Search Report dated Sep. 19, 2019 for Application No. 19 164 682.7.

(Continued)

*Primary Examiner* — Topaz L. Elliott
*Assistant Examiner* — Michael K. Reitz
(74) *Attorney, Agent, or Firm* — Schmeiser, Olsen & Watts LLP

(57) ABSTRACT

Provided is a direct drive wind turbine that includes: a hub, at least one blade fixed to the hub, a nacelle on which the hub is rotatably mounted for rotating about a rotational axis, the nacelle including an electrical generator connected to the hub in order to receive rotational energy from the hub, a tower on which the nacelle is mounted, and a lightning protection arrangement including a plurality of protection conductors extending between the at least one blade and the tower, the plurality of protection conductors including at least a first protection conductor mounted on an external surface of the electrical generator.

9 Claims, 3 Drawing Sheets

(51) Int. Cl.
  *F03D 15/20*    (2016.01)
  *F03D 9/25*     (2016.01)
  *F03D 1/06*     (2006.01)
(52) U.S. Cl.
  CPC ............ *F03D 9/25* (2016.05); *F05B 2240/14* (2013.01); *F05B 2240/21* (2013.01); *F05B 2240/30* (2013.01)

(56) References Cited

U.S. PATENT DOCUMENTS

| | | | |
|---|---|---|---|
| 2014/0348656 A1* | 11/2014 | Huang | F03D 80/30 416/146 R |
| 2016/0273521 A1* | 9/2016 | Huang | F03D 80/30 |
| 2017/0074251 A1* | 3/2017 | Airoldi | F03D 80/60 |
| 2017/0350373 A1* | 12/2017 | Hansen | F03D 1/0675 |

FOREIGN PATENT DOCUMENTS

| | | |
|---|---|---|
| CN | 206707942 U | 12/2017 |
| CN | 109253057 A | 1/2019 |
| EP | 1561947 A2 | 8/2005 |
| EP | 2395238 A1 | 12/2011 |
| EP | 3078852 A1 | 10/2016 |
| EP | 3144528 A1 | 3/2017 |

OTHER PUBLICATIONS

International Electrotechnical Commission, "Wind energy generation Systems—Part 24: Lightning protection," EN IEC 61400-24:2019; Aug. 2019; CENELEC. 200 pages.

* cited by examiner

LIGHTNING PROTECTION FOR A DIRECT DRIVE WIND TURBINE

CROSS-REFERENCE TO RELATED APPLICATIONS

This application claims priority to European Application No. 19164682.7, having a filing date of Mar. 22, 2019, the entire contents of which are hereby incorporated by reference.

FIELD OF TECHNOLOGY

The following relates to a lightning protection arrangement for a direct drive wind turbine.

BACKGROUND

Wind turbines include lightning protection arrangements to guide the lightning strokes from the blades through the hub, the nacelle and the tower and down to earth. A direct drive wind turbine typically comprises:
- a hub,
- a plurality of blades,
- a nacelle on which the hub is rotatably mounted,
- an electrical generator having an inner stator rigidly attached to the nacelle and an external rotor directly, i.e. without gearbox, rigidly attached to the hub,
- a hollow fixed shaft for supporting the hub and the electrical generator, a main bearing being interposed between the hub and the free end of the hollow fixed shaft for allowing the rotation of the assembly including the hub and the electrical generator rotor,
- a bedframe of the nacelle for supporting the hollow fixed shaft,
- a tower on which the bedframe of the nacelle is mounted, in such a way that the nacelle can rotate about a yaw axis substantially perpendicular to the ground.

In the described above structure, a lightning protection arrangement is normally present, which includes a plurality of conductors, for example conducting cables, extending from the blades to the tower and the ground. The standard IEC 61400-24 defines a lightning protection zone (LPZ) concept. In the hub and the nacelle, three main LPZs (Lightning Protection Zones) are defined:
- the hub,
- the space inside the hollow fixed shaft between the main bearing and the bedframe,
- the annular space between the hollow fixed shaft and the rotor house of the electrical generator.

At the transitions between zones surge protection devices (SPDs) have to be installed for transferring the high current generated by a lightning stroke to the ground. The requirements of the SPDs depend on the classification of the lightning zones, as defined in the standard IEC 61400-24.

Embodiments of the invention is that of providing a lightning protection arrangement for a direct drive wind turbine allowing the reduction of the requirements to the SPDs, according standard IEC 61400-24, by changing the classification of the above defined three LPZs. This results in costs savings.

SUMMARY

An aspect relates to a lightning protection arrangement for a direct drive wind turbine is provided. The wind turbine includes:
- a hub
- at least one blade fixed to the hub,
- a nacelle on which the hub is rotatably mounted for rotating about a rotational axis, the nacelle comprising an electrical generator connected to the hub in order to receive rotational energy from the hub,
- a tower on which the nacelle is mounted.

The lightning protection arrangement includes a plurality of protection conductors extending between the at least one blade and the tower, the plurality of protection conductors including at least a first protection conductor mounted on an external surface of the electrical generator.

Advantageously, by providing a protection conductor mounted on an external surface of the electrical generator the lightning protection zones inside the hollow fixed shaft and the annular space between the hollow fixed shaft and the rotor house can be classified as "zone 2" according to the standard IEC 61400-24. At the transitions between zones of this type no further protection through surge protection devices (SPDs) is required according to the standard IEC 61400-24.

In embodiments of the present invention, the electrical generator includes a rotor house rigidly connected to the hub for rotating about a rotational axis together with the hub the first protection conductor being mounted on an external surface of the rotor house. The external surface of the rotor house provides a convenient surface for the mounting of the protection conductor.

In other embodiments of the present invention, the plurality of protection conductors includes at least a second protection conductor mounted on an external surface of the hub and electrically connected to the first protection conductor. Advantageously, by providing a protection conductor mounted on an external surface of the hub, the hub lightning protection zone can be classified as "zone 2" according to the standard IEC 61400-24, thus obtaining the same advantage described above, i.e. that no further protection through surge protection devices (SPDs) is required according to the standard IEC 61400-24 at the transition between LPZs classified as "zone 2".

In embodiments of the present invention, the lightning protection arrangement includes the following plurality of protection conductors arranged in series from at least one blade to the tower:
- a protection conductor mounted along the blade,
- a protection conductor mounted on an external surface of the hub and electrically connected to the protection conductor mounted along the blade at the pitch bearing provided between the blade and the hub,
- a protection conductor mounted on an external surface of the rotor house and electrically connected to the protection conductor mounted on the external surface of the hub at the main bearing of the wind turbine,
- sliding contacts provided between the brake disk and the fixed shaft and electrically connected to the protection conductor mounted on the external surface of the rotor house,
- a protection conductor mounted on a fixed shaft of the nacelle and electrically connected to the sliding contacts provided between the brake disk and the fixed shaft,
- a protection conductor mounted on a bedframe of the nacelle and electrically connected to the protection conductor mounted on the fixed shaft,
- a protection conductor mounted on the tower of the wind turbine and electrically connected to the protection conductor mounted on the bedframe.

BRIEF DESCRIPTION

Some of the embodiments will be described in detail, with references to the following Figures, wherein like designations denote like members, wherein.

DETAILED DESCRIPTION

Figure 1:
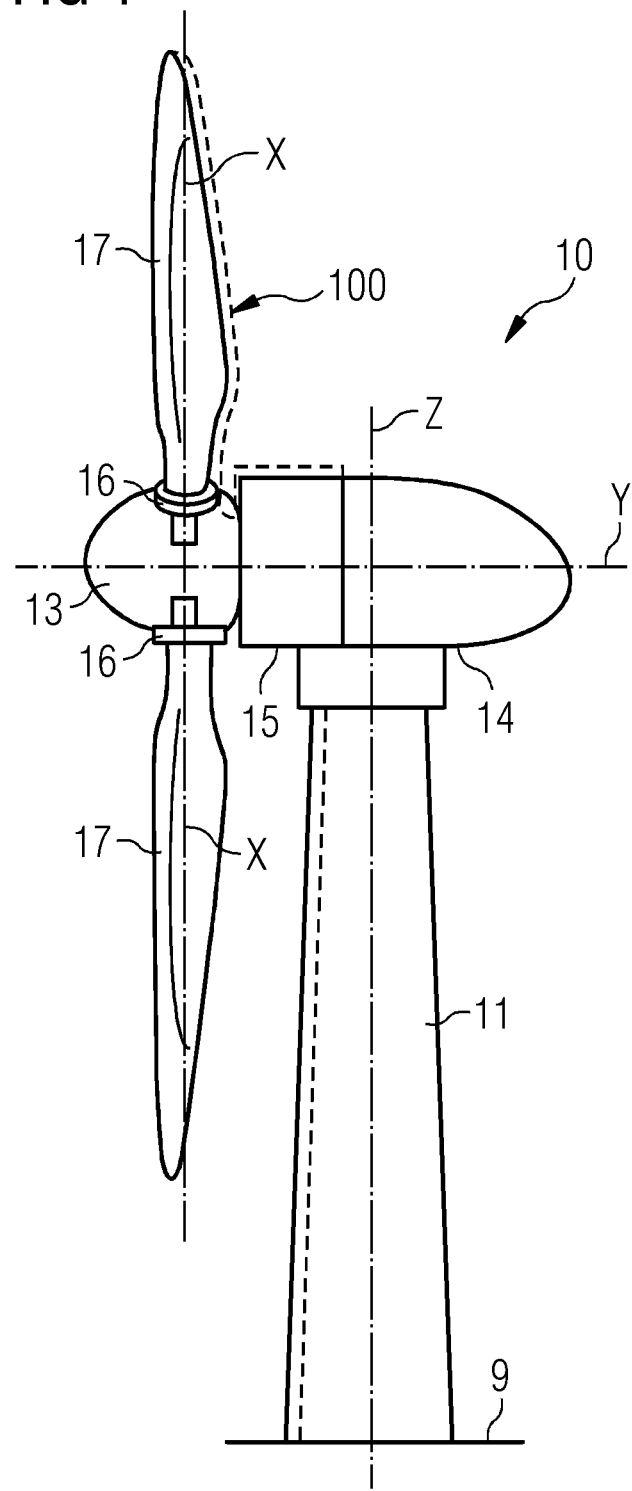
FIG. 1 shows a schematic lateral view of a direct drive wind turbine including a lightning protection according to embodiments of the present invention.
Figure 2:
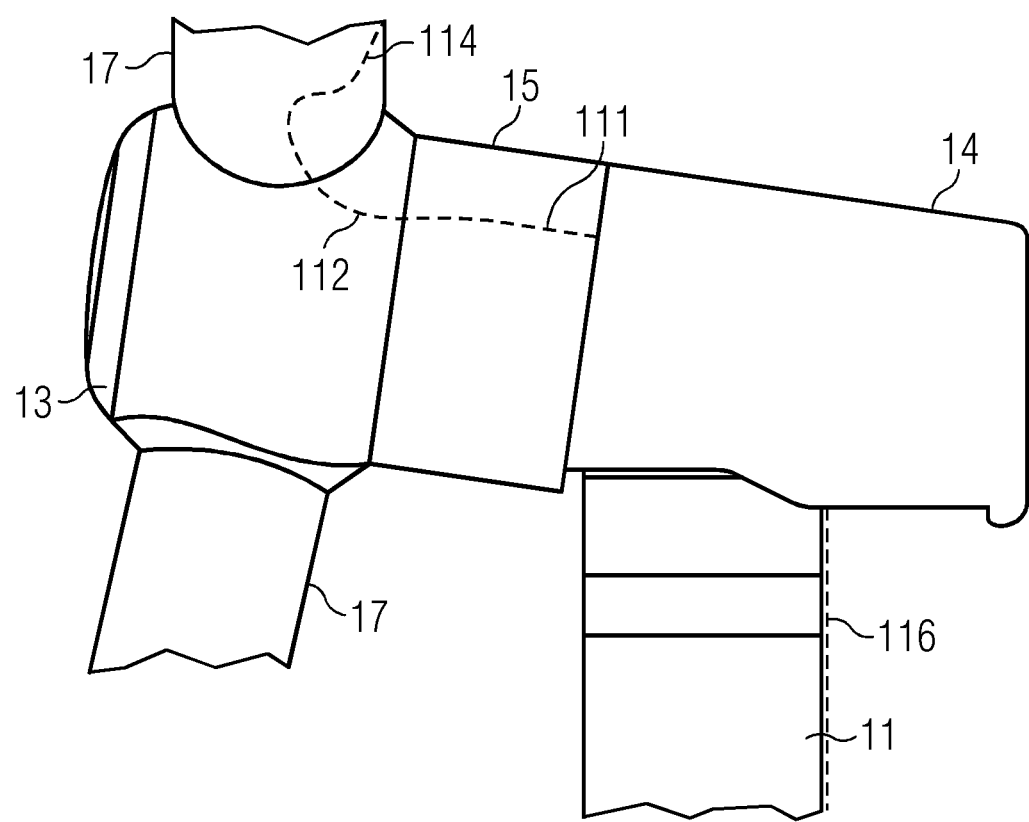
FIG. 2 shows a more detailed lateral view of the direct drive wind turbine of FIG. 1.

FIGS. 1 and 2 show a direct drive wind turbine 10 for generating electricity. The wind turbine 10 comprises a tower 11 which is mounted on the ground 9 at one bottom end. At the opposite top end of the tower 11 there is mounted a nacelle 14. The nacelle 14 is usually mounted rotatable with regard to the tower 11 about a yaw axis Z substantially perpendicular to the ground 9. The nacelle 12 includes an electrical generator 15. Furthermore, the wind turbine 10 comprises a hub 13 which is rotatably attached to the nacelle 14 for rotating about a rotational axis Y, which is a longitudinal axis of the nacelle 14. The hub 13 is hollow and space inside the hub 13 defines a first lightning protection zone according to the standard IEC 61400-24. When not differently specified, the terms axial or longitudinal, radial and circumferential in the following are made with reference to the longitudinal rotor axis Y. The electrical generator 15 is connected to the hub 13 in order to receive rotational energy from the hub 13.

The wind turbine 1 further comprises at least one blade 17 (in the embodiment of FIG. 1, the wind rotor comprises three blades 17, of which only two blades 17 are visible) mounted on the hub 13. The blades 17 extend substantially radially with respect to the rotational axis Y. The hub 13 comprises three flanges for connecting a respective blade 17 to the hub 13. A pitch bearing 16 is interposed between each blade flange and the respective blade 17. A hydraulic pitch actuation circuit is associated to the pitch bearings 16 of the blades 17 for regulating the pitch angle of each blade, i.e. the angular position of each blade about a respective blade longitudinal axis X.

The wind turbine 10 comprises a lightning protection arrangement 100, as better detailed in the following.

Figure 3:
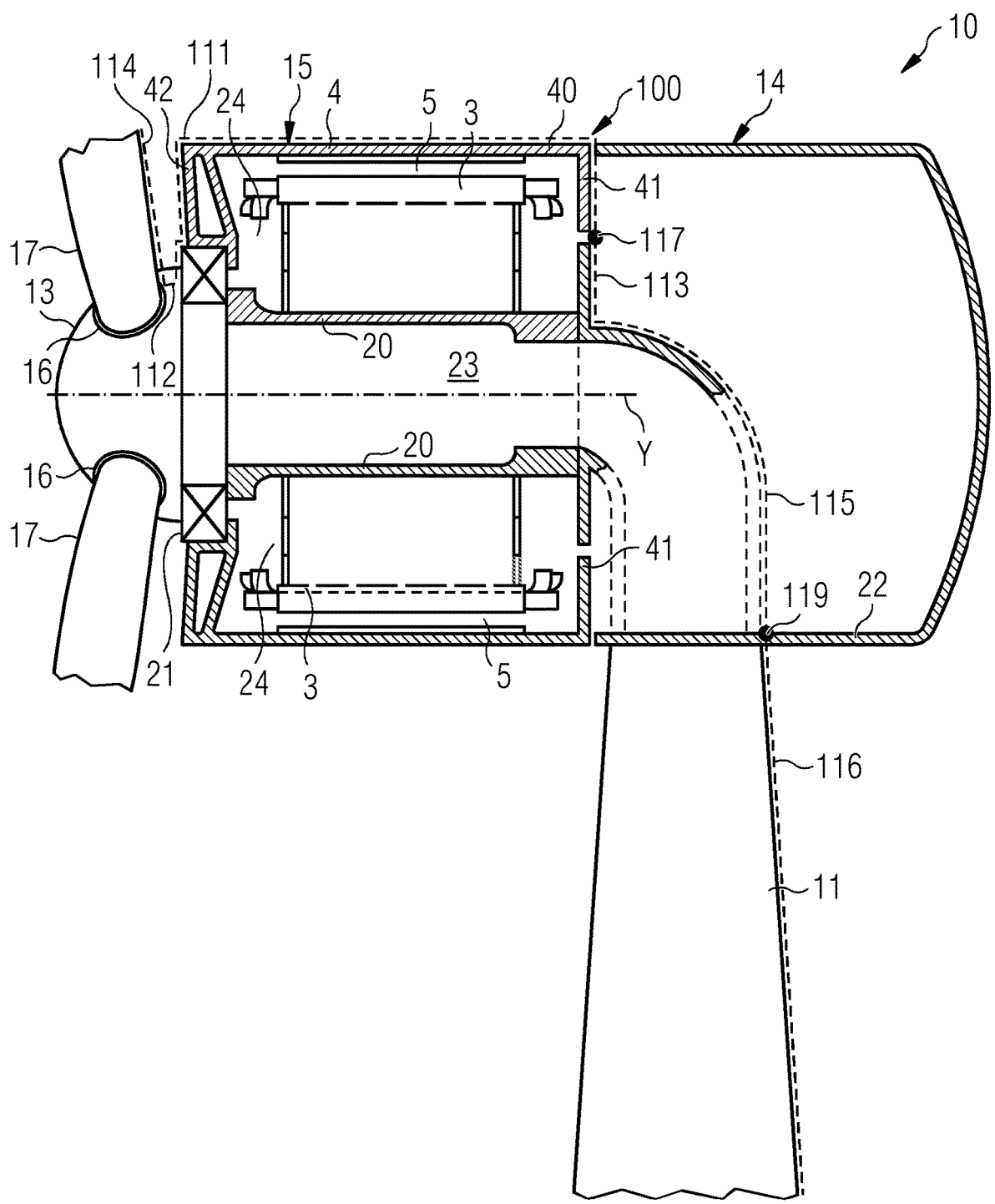
FIG. 3 shows a schematic sectional view of the direct drive wind turbine of the FIGS. 1 and 2.

With reference to FIG. 3 the nacelle 14 includes a bedframe 22 having a flange for rotatably connecting the nacelle 14 to the tower 11 for allowing the rotation of the nacelle about the yaw axis Z. The nacelle further includes a hollow fixed shaft 20 extending coaxially with respect to the rotational axis Y. The hollow fixed shaft 20 coaxially extends along the rotational axis Y between two longitudinal ends, one of which is rigidly attached to the bedframe 22. A main bearing 21 of the wind turbine 10 is mounted the other longitudinal end of the hollow fixed shaft 20. The hub 13 is connected to the main bearing 21 for allowing the rotation of the hub 13 about the rotational axis Y. The hollow space 23 inside the hollow fixed shaft 20 defines a second lightning protection zone according to the standard IEC 61400-24.

The electrical generator 15 extending along the rotational axis Y between a drive end adjacent to the hub 13 and a non-drive end adjacent to the bedframe 22. The electrical generator 15 comprises an outer rotor 4 and an inner stator 3, separated by an air-gap 5. The stator 3 is rigidly supported by the hollow fixed shaft 20. During operation, the outer rotor 4 is caused to rotate about the rotational axis Y in order to transform mechanical energy into electrical energy. The rotor includes an external rotor house 40 coaxially extending along the rotational axis Y between a hub interface 42 and a brake disc 41. The hub interface 42 is rigidly connected to the hub 13 and rotational connected to the main bearing 21 for allowing the rotation of the assembly including the hub 13 and the rotor house 40 about the rotational axis Y. The brake disk 41 locks the rotation of the rotor 4 with respect to the stator 3 when required by the operating conditions. The annular space 24 between the hollow fixed shaft 20 and the rotor house 40 of the electrical generator 15 defines a third lightning protection zone according to the standard IEC 61400-24.

The lightning protection arrangement 100 (schematically represented in FIG. 3 by a dashed line) includes a plurality of protection conductors extending between at least one blade 17 and the tower 11 for transferring the electric current of a lightning stroke hitting the blade to the ground 9. The plurality of protection conductors may include a plurality of conducting cable and a plurality of conducting brushes installed between components relatively rotating with respect to one another. The lightning protection arrangement 100 includes a first protection conductor 111 mounted on an external surface of the electrical generator 15. In particular the first protection conductor 111 may be mounted on an external surface of the rotor house 40. The first protection conductor 111 may include one or more conducting cables. The first protection conductor 111 longitudinally extends between the hub interface 42 and the brake disk 41. The plurality of protection conductors includes a second protection conductor 112 mounted on an external surface of the hub 13 and electrically connected to the first protection conductor 111 at the main bearing 21. The plurality of protection conductors include a third protection conductor 113 mounted on a flange of the bedframe 22 and electrically connected to the first protection conductor 111 by means of sliding contacts 117 provided between the brake disk 41 and the fixed shaft 20. Alternatively, according to other embodiments of the invention, the third protection conductor 113 is mounted on the fixed shaft 20, in particular on a flange of the fixed shaft 20. The plurality of protection conductors include a fourth protection conductor 114 mounted on at least one blade 17 and electrically connected to the second protection conductor 112 at the respective pitch bearing 16 provided between the blade 17 and the hub 13. The plurality of protection conductors include a fifth protection conductor 115 mounted on the bedframe 22 and electrically connected to the third protection conductor 113. The plurality of protection conductors include a sixth protection conductor 116 mounted on the tower 11 and electrically connected to the fifth protection conductor 115 by means of sliding contacts 119. The sixth protection conductor 116 is further connected to the ground 9.

The lightning protection arrangement 100 provides an electrical connection between at least one of the blades 17 of the wind turbine 10 and the ground. According to the embodiment of FIG. 3, the lightning protection arrangement 100 includes the following plurality of protection conductors arranged in series:

the fourth protection conductor 114 along the blade 17,
the second protection conductor 114 on an external surface of the hub 13,
the first protection conductor 111 on an external surface the rotor house 40,
the sliding contacts 117 between the brake disk 41 and a flange of the bedframe 22, the third protection conductor 113 on a flange of the bedframe 22, the fifth protection conductor 115 along the bedframe 22 up to the interface with the tower 11, the sliding contacts 119 between the bedframe 22 and the tower 11, the sixth protection conductor 116 along the tower 11 up to the ground 9.

The presence of the protection conductors 111, 112 on external surfaces, i.e. exposed to the external environment, of the electrical generator 15 and the hub 13, respectively permits to classify the three lightning protection zones above defined, i.e. inside the hub 13, inside the fixed shaft 20 and in the annular space 24 between the hollow fixed shaft 20 and the rotor house 40, as "zone 2" according to the standard IEC 61400-24. This allows reducing the requirements to the SPDs at the transitions between the three zones.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A lightning protection arrangement for a direct drive wind turbine, the wind turbine including: a hub, at least one blade fixed to the hub, a nacelle on which the hub is rotatably mounted for rotating about a rotational axis, the nacelle including an electrical generator connected to the hub in order to receive rotational energy from the hub, the electrical generator longitudinally extending between a hub interface rigidly connected to the hub and a longitudinally opposite brake disk, a tower on which the nacelle is mounted, and a hollow fixed shaft for supporting the hub and the electrical generator, and a bedframe rigidly attached to the hollow fixed shaft, wherein an annular space is arranged between the hollow fixed shaft and the rotor house, the lightning protection arrangement comprising:

a plurality of protection conductors extending between the at least one blade and the tower, the plurality of protection conductors including at least:

a first protection conductor mounted on an external surface of the electrical generator, the first protection conductor extending between the hub interface and the brake disk;

a second protection conductor mounted on an external surface of the hub and electrically connected to the first protection conductor; and a third protection conductor mounted on the hollow fixed shaft and electrically connected to the first protection conductor;

a fourth protection conductor mounted on the at least one blade and electrically connected to the second protection conductor; and a fifth protection conductor mounted on the bedframe and electrically connected to the third protection conductor;

wherein the fourth protection conductor, the second protection conductor, the first protection conductor, the third protection conductor, and the fifth protection conductor are arranged in series such that an electrical path of the lightning protection arrangement goes from the fourth protection conductor mounted on the blade to the second protection conductor mounted on the external surface of the hub to the first conductor mounted on the external surface of the electrical generator to the third protection conductor mounted on the hollow fixed shaft within the nacelle to the fifth protection conductor mounted on the bedframe.

2. The lightning protection arrangement according to claim 1, wherein the electrical generator includes a rotor house rigidly connected to the hub for rotating about the rotational axis together with the hub, and the plurality of protection conductors including the first protection conductor mounted on an external surface of the rotor house.

3. The lightning protection arrangement according to claim 1, wherein the electrical connection between the first protection conductor and the third protection conductor is provided through sliding contacts between the brake disk and the hollow fixed shaft.

4. The lightning protection arrangement according to claim 3, wherein the sliding contacts between the brake disk and the hollow fixed shaft are the only sliding contacts located between wherein the fourth protection conductor, the second protection conductor, the first protection conductor, the third protection conductor, and the fifth protection conductor.

5. The lightning protection arrangement according to claim 1, wherein the wind turbine comprises a main bearing between the hollow fixed shaft and the assembly including the hub and the rotor house, the electrical connection between the first protection conductor and the second protection conductor is provided at the main bearing.

6. The lightning protection arrangement according to claim 1, wherein an electrical connection between the second protection conductor and the fourth protection conductor is provided at a pitch bearing provided between the at least one blade and the hub.

7. The lightning protection arrangement according to claim 1, wherein the plurality of protection conductors include at least a sixth protection conductor mounted on the tower and electrically connected to the fifth protection conductor.

8. The lightning protection arrangement according to claim 7, wherein the electrical connection between the fifth protection conductor and the sixth protection conductor is provided through sliding contacts between the bedframe and the tower.

9. A wind turbine including:
a hub;
at least one blade fixed to the hub;
a nacelle on which the hub is rotatably mounted for rotating about a rotational axis, the nacelle comprising an electrical generator connected to the hub in order to receive rotational energy from the hub;
a tower on which the nacelle is mounted; and
the lightning protection arrangement according to claim 1.

* * * * *